Figures 1, 2:
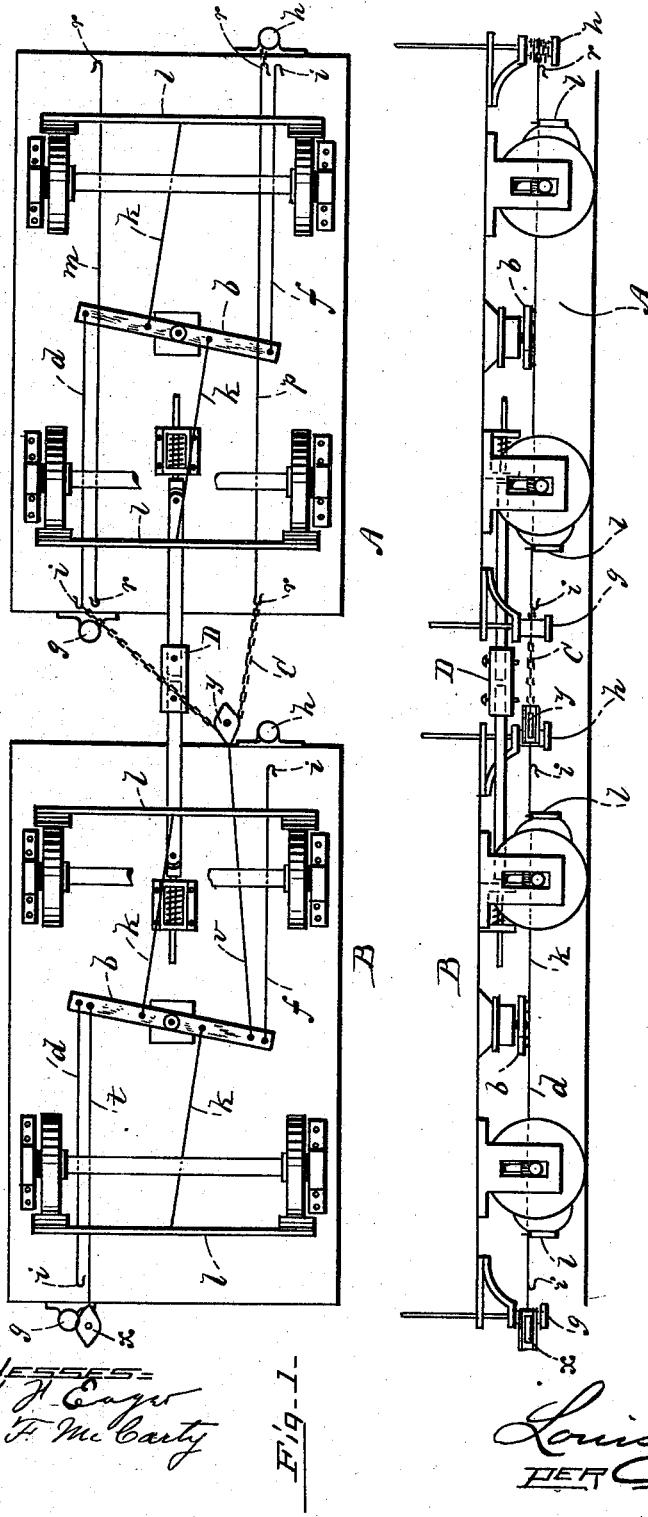

(No Model.)

L. PFINGST.
BRAKE FOR ELECTRIC CARS.

No. 413,960. Patented Oct. 29, 1889.

WITNESSES:
M. F. Eager
E. F. McCarty

INVENTOR:
Louis Pfingst,
PER C. A. Shaw & Co.
ATTYS

UNITED STATES PATENT OFFICE.

LOUIS PFINGST, OF BOSTON, MASSACHUSETTS.

BRAKE FOR ELECTRIC CARS.

SPECIFICATION forming part of Letters Patent No. 413,960, dated October 29, 1889.

Application filed September 2, 1889. Serial No. 322,690. (No model.)

*To all whom it may concern:*

Be it known that I, LOUIS PFINGST, of Boston, in the county of Suffolk, State of Massachusetts, have invented a certain new and useful Improvement in Brakes for Electric Cars, of which the following is a description sufficiently full, clear, and exact to enable any person skilled in the art or science to which said invention appertains to make and use the same, reference being had to the accompanying drawings, forming part of this specification, in which—

Figure 1 is a bottom plan view showing two cars provided with my improvement, and Fig. 2 a side elevation of the same.

Like letters and figures of reference indicate corresponding parts in both figures of the drawings.

My invention relates especially to brakes which are particularly adapted for use upon cars in which electricity is employed as a motive power; and it consists in certain novel features, as hereinafter fully set forth and claimed, the object being to produce a simpler, cheaper, and more effective device of the character than is now in ordinary use.

The nature and operation of the improvement will be readily understood by all conversant with such matters from the following explanation.

In the drawings, A represents the electric car, or car supplied with the motor, and B a car of the ordinary construction. A horizontal brake-lever $b$ is pivoted centrally to the bottom of the car in the usual manner, and rods $d\,f$ extend longitudinally from opposite ends of said lever to the brake-spindles $g\,h$, respectively, said rods being supplied in their outer ends with hooks $i$, in which the brake-chains connecting them with said spindles are secured. A rod $k$ connects the center lever $b$ with each brake-beam $l$ in the usual manner. The cars A B are secured together by the usual spring-cushioned coupling D, which permits a slight longitudinal play to said cars. Two longitudinally-arranged supplemental rods $m\,p$ are fitted to slide loosely in eyes or other suitable bearings in the brake-beams of the electric car A. Said rods are disposed parallel with and adjacent to the brake-rods $d\,f$, respectively, and are provided at each end with a hook $r$. Two supplemental rods $t\,v$ are pivoted by one end to opposite ends of the central lever $b$ of the car B and parallel with the brake-rods $d\,f$, respectively. The rods $t\,v$ are respectively provided on their outer ends with horizontally-arranged pulleys $x\,y$.

In the use of my improvement, when the motor-car A or ordinary car B is used separately, the hooks $i$ of the rods $d\,f$ are connected by chains to the respective brake-spindles $g\,h$ and the brakes operated in the usual manner. When the motor-car A is employed to draw one or more cars B, the chain is detached from the hook $i$ of the rods $f$ at the forward end of each car, said chain on the car A being transferred to the adjacent hook $r$ of the supplemental rod $p$. A chain C has one end detachably secured in the hook $r$ at the rear end of the rod $p$, and is passed around the pulley $y$ on the rod $v$ at the forward end of the car B, its opposite end being attached to the hook $i$ on the ordinary brake-rod $d$ at the rear of the motor-car. When the brakeman at the forward end of the motor-car sets the brake, the supplemental rod $p$ is drawn forward. The chain C is tightened thereby on the pulley $y$ of the car B, causing the supplemental rod $v$ to actuate the central lever $b$ on said car and set the brakes $l$ at the forward end thereof. The chain C being secured to the ordinary rod $d$ at the rear of the motor-car, as described, when the rear car B is thus checked its weight is added to the strain on said chain, and great power is thus applied to said rod $d$, moving the central lever $b$ of the motor-car and rapidly setting its forward brakes $l$.

It will be seen that by use of the equalizing-pulleys and chain C the necessity of employing a brakeman on each car is overcome, the brakes being also applied nearly simultaneously on both cars and the train stopped much more quickly than when the ordinary brakes are used.

It will be understood that the supplemental rods $m\,t$ and pulley $x$ are inactive when the cars are in the position shown, said rods and pulley being only employed when the opposite ends of the cars are coupled together.

Having explained my invention, what I claim is—

1. A brake device for a train of electric cars, comprising a chain connected with the forward brake-spindle of the motor-car, passing over a pulley on a brake-rod of the following car, and secured to the rear brake-rod of said motor-car, substantially as described.

2. In a device of the character described, a car provided with a supplemental brake-rod having a pulley at its outer end and a chain passing over said pulley, its ends being respectively connected with the rear brake-rod and forward brake-spindle of the car, substantially as described.

3. In a car-brake, a pulley on the brake mechanism of a rear car and a chain passing over said pulley and connected with the brake mechanism of a forward car, substantially as and for the purpose set forth.

4. In a car-brake mechanism, a supplemental rod on a lead-car, connected with its forward brake-spindle, and a chain secured to the rear end of said rod and passing over a pulley on a forward brake-rod on a following car and connected with the ordinary brake-rod at the rear of the lead-car, substantially as described.

5. In a car-brake of the character described, an independent rod detachably connected with the forward brake-spindle of a lead-car, a supplemental rod connected with the brake-lever of a following car, a pulley on the outer end of said rod, and a chain passing over said pulley and having its ends respectively secured to said independent rod and the rear brake-rod of the lead-car, substantially as and for the purpose specified.

6. In a device of the character described, the combination of a motor-car provided with independent rods parallel with its brake-rods and adapted to be connected with the brake-spindles, a car having supplemental brake-rods bearing a pulley on their outer ends, and a chain passing over one of said pulleys and having its ends respectively attached to an independent rod and a brake-rod on said motor-car, substantially as described.

7. In a device of the character described, a lead-car provided with independent rods adjacent to its brake-rods and attachable to the brake-spindle, hooks in the ends of said rods, a car having supplemental rods on its brake-lever, provided with a pulley on their outer ends, and a chain attachable to an independent rod and an ordinary brake-rod of the lead-car, said chain passing over one of said pulleys, whereby the brakes of both cars may be applied by one spindle on the lead-car, substantially as described.

8. The car B, provided with the supplemental brake-rods $t\ v$, bearing pulleys $y\ x$, substantially as and for the purpose set forth.

9. The car A, provided with the independent rods $m\ p$, attachable to the brake-spindles, in combination with the car B, having the supplemental brake-rods $t\ v$, provided with pulleys $x\ y$, and the chain C, for connecting said pulleys with an ordinary brake-rod and the opposite independent rod of the car A, substantially as described.

LOUIS PFINGST.

Witnesses:
O. M. SHAW,
E. F. McCARTY.